(12) United States Patent
Rochon et al.

(10) Patent No.: US 8,031,607 B2
(45) Date of Patent: Oct. 4, 2011

(54) IMPLEMENTATION OF INTERNET PROTOCOL HEADER COMPRESSION WITH TRAFFIC MANAGEMENT QUALITY OF SERVICE

(75) Inventors: Michel Rochon, Kanata (CA); Adrian Ellsworth, Stittsville (CA); Vernon Joshua Stanley Dennis, Kanata (CA)

(73) Assignee: Alcatel Lucent, Paris (FR)

( * ) Notice: Subject to any disclaimer, the term of this patent is extended or adjusted under 35 U.S.C. 154(b) by 126 days.

(21) Appl. No.: 12/362,292

(22) Filed: Jan. 29, 2009

(65) Prior Publication Data

US 2010/0188974 A1     Jul. 29, 2010

(51) Int. Cl.
  *G01R 31/08*     (2006.01)
(52) U.S. Cl. .......................................... 370/235
(58) Field of Classification Search ............. 370/395.21, 370/230, 389, 203, 229–240, 254–258, 310–328, 370/343–350, 351–356, 395.1, 395.3, 395.41, 370/395.42, 395.5, 395.52, 395.53, 395.54, 370/395.61, 397, 400–409, 412–421, 465–479, 370/503–512
See application file for complete search history.

(56) References Cited

U.S. PATENT DOCUMENTS

| | | | |
|---|---|---|---|
| 5,828,653 A * | 10/1998 | Goss | |
| 6,577,596 B1 * | 6/2003 | Olsson et al. | 370/230 |
| 6,765,909 B1 * | 7/2004 | Sen et al. | 370/392 |
| 7,215,667 B1 * | 5/2007 | Davis | |
| 7,397,819 B2 * | 7/2008 | Kobayashi | |
| 2004/0081093 A1 * | 4/2004 | Haddock et al. | 370/230 |
| 2004/0264433 A1 | 12/2004 | Melpignano | |
| 2007/0002850 A1 * | 1/2007 | Guichard et al. | |
| 2008/0056273 A1 | 3/2008 | Pelletier et al. | |
| 2009/0052453 A1 * | 2/2009 | Lee et al. | 370/392 |
| 2009/0103478 A1 | 4/2009 | Sammour et al. | |
| 2009/0109924 A1 | 4/2009 | Sato | |
| 2009/0116384 A1 | 5/2009 | Kim et al. | |
| 2009/0268613 A1 * | 10/2009 | Sagfors | |
| 2010/0034187 A1 | 2/2010 | Kumar et al. | |
| 2010/0046424 A1 | 2/2010 | Lunter et al. | |
| 2010/0135330 A1 * | 6/2010 | Liang et al. | |

* cited by examiner

*Primary Examiner* — Kwang B Yao
*Assistant Examiner* — Jung-Jen Liu
(74) *Attorney, Agent, or Firm* — Kramer & Amado P.C.

(57) ABSTRACT

Various exemplary embodiments relate to a method and related network node including one or more of the following: receiving a packet belonging to a flow, the packet including a marking used to identify a quality of service (QoS) required for the packet; performing buffer management to determine whether a current occupancy level of a buffer in the network node is greater than a threshold level; when the current occupancy level of the buffer does not exceed the threshold level, performing header compression on the packet in the network node; after performing header compression, performing traffic scheduling to queue the packet in a queue selected from a plurality of queues based on the marking in the packet and to output the packet from the selected queue; and forwarding the packet towards a destination, whereby buffer management, header compression, and traffic scheduling are all performed in a single network node.

18 Claims, 3 Drawing Sheets

IMPLEMENTATION OF INTERNET PROTOCOL HEADER COMPRESSION WITH TRAFFIC MANAGEMENT QUALITY OF SERVICE

TECHNICAL FIELD

Embodiments disclosed herein relate generally to compression of Internet Protocol (IP) headers and, more particularly, to concurrent implementation of IP header compression and traffic management functionality.

BACKGROUND

Modern packet-switched networks accommodate a greater number of users and larger amount of traffic than ever before. Unfortunately, the services desired by users now require a much greater amount of bandwidth, while demanding near real-time service in many cases. Consider, for example, a typical user's experience with a mobile phone. While, several years ago, many users were content with voice-only service, many mobile phones now double as personal computers, providing access to streaming video, peer-to-peer applications, and other high bandwidth applications. Furthermore, non-mobile networks have also experienced a significant increase in traffic, as Voice Over Internet Protocol (VoIP), IP Television (IPTV), and similar services have gradually increased in popularity.

Service providers have struggled to keep pace with the ever-increasing bandwidth requirements. Given the significant expenses associated with adding additional equipment, service providers are reluctant to address this problem by simply increasing the capacity of the network. Instead, many service providers desire to decrease costs and simultaneously improve the user's quality of experience by optimizing the efficiency of data transfer over the network.

One such optimization relates to compression of headers associated with packets transferred over the network. In bandwidth-sensitive portions of the network, many service providers employ a header compression algorithm to decrease the amount of data sent over the network. As an example, this header compression may be implemented according to Request For Comments 2507, "IP Header Compression," published by the Internet Engineering Task Force (IETF). More specifically, during an initialization phase, a node known as a compressor sends a full header including a context identifier, which uniquely identifies the flow associated with the packet. A node known as a decompressor receives the full header and stores the associated context identifier. Subsequently, the compressor may send a "compressed" version of the header, which includes the context identifier, but omits much of the information included in the uncompressed header. Because the decompressor maintains a record of the context identifier and associated header information, the decompressor may reconstruct the uncompressed header rising the information contained in the compressed version.

A second optimization relates to traffic management services implemented by provider edge nodes. In particular, a typical provider edge node implements a service that prioritizes traffic, such that traffic is treated differently depending on a level of service assigned to the traffic. During periods of congestion, the node prioritizes high priority traffic, while temporarily blocking low priority traffic. This technique ensures that the most important traffic reaches its destination by delaying transmission of less important traffic until the congestion subsides.

It would be desirable to implement a network node that performs both header compression and traffic management services. Current solutions, however, fail to concurrently implement both services in a single network node in a manner that achieves the desired benefits of both, while avoiding any potential conflicts. In particular, current solutions fail to resolve the characteristics of the header compression and traffic management functionality, such that each service functions optimally when they are combined.

For the foregoing reasons and for further reasons that will be apparent to those of skill in the art upon reading and understanding this specification, there is a need for a solution that enables implementation of packet header compression in a node including traffic management functionality.

SUMMARY

In light of the present need for concurrent implementation of packet header compression and traffic management functionality, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node for implementing header compression and traffic management including one or more of the following: receiving, at the network node, a packet belonging to a flow, the packet including a marking used to identify a quality of service (QoS) required for the packet; performing buffer management in the network node to determine whether a current occupancy level of a buffer in the network node is greater than a threshold level; when the current occupancy level of the buffer is less than or equal to the threshold level, performing header compression on the packet in the network node; after performing header compression, performing traffic scheduling in the network node to queue the packet in a queue selected from a plurality of queues based on the marking in the packet and to output the packet from the selected queue at an appropriate time; and forwarding the packet towards a destination, It should be apparent that, in this manner, various exemplary embodiments implement buffer management, header compression, and traffic scheduling in a single network node without introducing any undesirable side effects, such as dropped full headers or failure to optimally use bandwidth. Consequently, a service provider may utilize the method and network node to offer header compression and traffic management concurrently, while maintaining their respective benefits.

BRIEF DESCRIPTION OF THE DRAWINGS

In order to better understand various exemplary embodiments, reference is made to the accompanying drawings, wherein.

DETAILED DESCRIPTION

Figure 1:
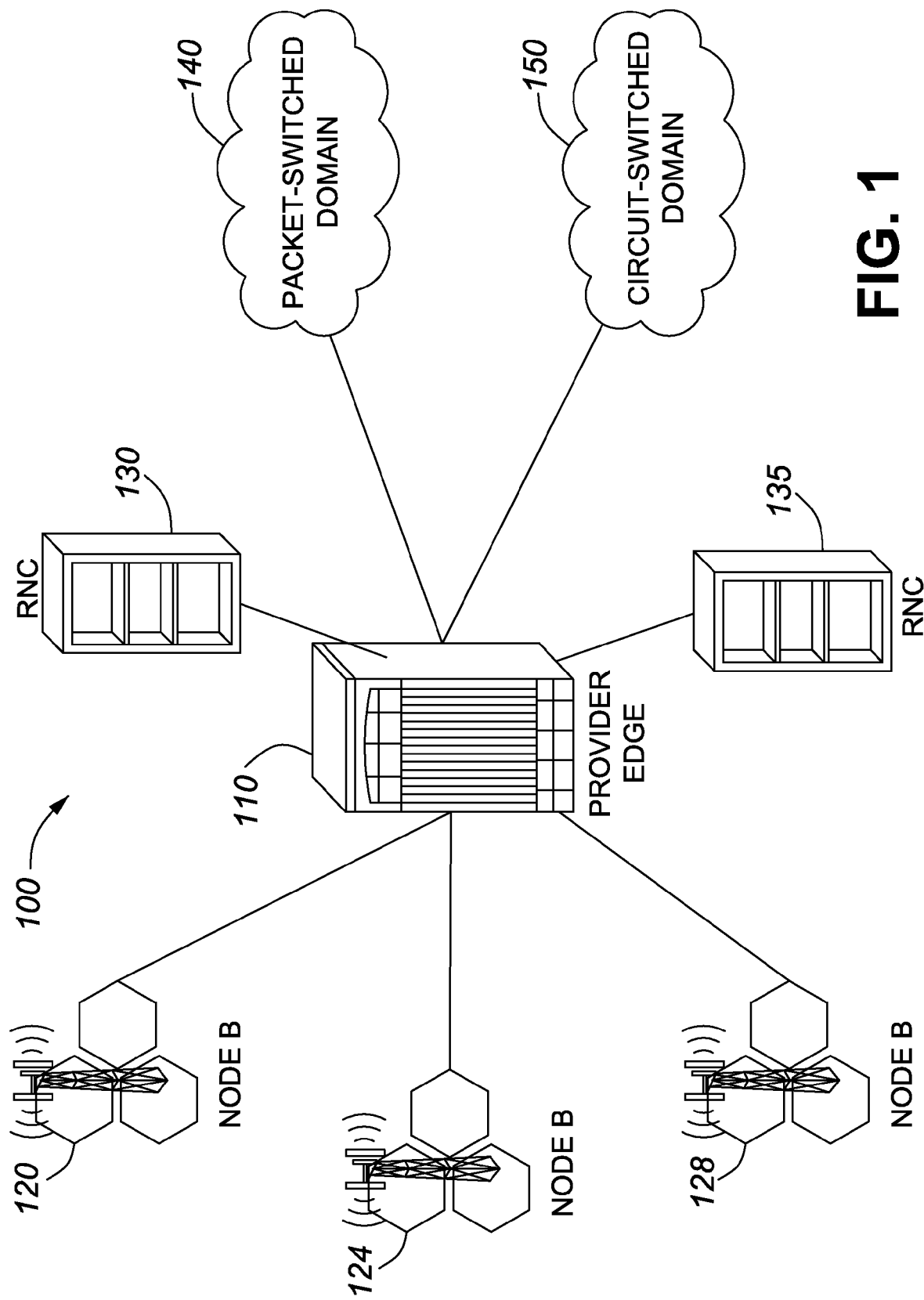
FIG. 1 is a schematic diagram of an exemplary system including a provider edge node that implements both header compression and traffic management functionality.

Referring now to the drawings, in which like numerals refer to like components or steps, there are disclosed broad aspects of various exemplary embodiments.

FIG. 1 is a schematic diagram of an exemplary system 100 including a provider edge node 110 that implements both header compression and traffic management functionality. In various exemplary embodiments, system 100, which may be a telecommunications network, includes provider edge node 110, a plurality of wireless base stations 120, 124, 128, a plurality of radio network controllers (RNC) 130, 135, a packet-switched domain 140, and a circuit-switched domain 150.

Provider edge node 110 may be a router including a plurality of cards configured to exchange packets and other data between the components of system 100 and any other telecommunication components. In particular, node 110 may aggregate and connect a plurality of wireless base stations 120, 124, 128 to a plurality of RNCs 130, 135. Additionally, node 110 may be configured to receive data from packet-switched domain 140 or circuit-switched domain 150 and forward this data to user nodes through wireless base stations 120, 124, 128.

As described in further detail below with reference to FIG. 2, node 110 may implement packet header compression to preserve bandwidth, particularly when transmitting data to wireless base stations 120, 124, 128 for wireless transmission. The header compression performed by node 110 may be accomplished in accordance with Request For Comments (RFC) 2507, published by the Internet Engineering Task Force, or any similar methodology known to those of skill in the art.

Thus, node 110 may receive a packet for forwarding and determine an appropriate compression context identifier for the flow associated with the packet. The context identifier may be any value used to uniquely identify a flow between node 110 and the destination that will decompress the packet, known as the decompressor. Node 110 may also generate a value known as the generation, which is a value that is incremented or otherwise modified each time the context is changed. After generating the context identifier and generation value, node 110 may store these values for subsequent retrieval.

When a packet received at node 110 is the first packet in a flow, compressor 110 may assign a new context identifier and generation to the flow, then send a full header for the packet to the decompressor. The full header will include the context identifier, generation, and all information necessary to identify the flow and reconstruct a complete, uncompressed packet header. For packets including full headers, the context identifier and generation may be placed in the packet length field of the header.

When a received packet is a subsequent packet in the flow, node 110 may access the information in the packet header, look rip the corresponding context identifier and generation, then send a compressed packet including the context identifier and generation. For packets with compressed headers, the header of the packet includes space for the context identifier and generation. Furthermore, the compressed packet may exclude information that remains constant between packets, such as the source address, source port, destination address, destination port, time-to-live (TTL), etc.

In addition, as also described in further detail below with reference to FIG. 2, node 110 may provision quality of service (QoS) to flows handled by node 110. In particular, node 110 may include a traffic manager that manages the buffer in node 110 to prevent buffer overruns. In addition, node 110 may include a plurality of queues, each queue corresponding to a different QoS. Thus, node 110 may direct packets to an appropriate outgoing queue based on a marking in the packet.

According to the various exemplary embodiments, node 110 performs traffic management and header compression operations in an optimal order, such that maximal benefits are obtained for each function. In particular, node 110 may perform buffer management prior to header compression, such that an incoming packet is discarded when there is no additional space in the buffer of node 110. Performing buffer management prior to header compression ensures that node 110 properly queues and transmits any full headers required to establish a compression context. In other words, node 110 ensures that there is room in the buffer prior to performing any compression of headers.

In contrast, nodes that perform buffer management after header compression could potentially discard a full header, thereby affecting the compression context and potentially causing data loss at the decompressor. For example, such an implementation could result in unnecessary discard of compressed packets at the decompressor, as the decompressor may be unaware of the context identifier included in the compressed packets.

In addition, node 110 may perform header compression prior to scheduling the packet in an appropriate queue based on the quality of service required for the packet. In this manner, node 110 may ensure that packets outputted from the queues in node 110 utilize all available bandwidth, avoid jitter, and minimize delays to high priority traffic. As an example, suppose node 110 has 3 megabits per second (Mbit/s) of bandwidth available for output of packets. By compressing packet headers prior to queuing the packets, node 110 ensures that the combined output of all packets with full headers, packets with compressed headers, and packets with uncompressed headers maxes out at 3 Mbit/s, while avoiding jitter and delays.

In contrast, a system that performs header compression after the packet is outputted from the queue would introduce problems, regardless of the placement of the header compression relative to a bandwidth limiter, such as a shaper, rate limiter, or the like. Consider the first scenario, in which header compression is performed after the bandwidth limiter. If headers were compressed after packets were outputted from the bandwidth limiter, the output from the node would decrease to less than the full amount of available bandwidth. In this case, header compression would have no effect at all, as the number of packets outputted from the node would remain the same.

Increasing the rate at which packets are outputted from the queues would fail to address this problem, as the ratio of compressed to uncompressed packet headers is unpredictable. As a result, the bandwidth occupied by packets to be transmitted by the node could potentially exceed the allotted bandwidth. In this case, high priority packets could potentially be discarded, thereby undermining the traffic management functionality of the node.

In the second scenario, in which the header compression is performed after dequeuing, but prior to the bandwidth limiter, a number of problems would still result. In particular, if the bandwidth limiter runs after compression, a situation may result where highly-congested low priority queues leak at the expense of high priority queues. Thus, although the node will output packets using all available bandwidth, such an arrangement may result in unnecessary jitter and delay on high priority traffic.

It should be apparent from this description that the ordering of the buffer management, header compression, and scheduling operations ensures optimal performance of node 110. In particular, performing buffer management prior to header compression and header compression prior to scheduling of packets ensures that each functionality achieves the desired benefits.

The above description of the operation of node 110 is intended to provide an overview of the operation of node 110 and is a simplification in some respects. The detailed operation of the components of node 110 will be described in further detail below with reference to FIG. 2.

System 100 also includes wireless base stations 120, 124, 128, which may be devices including an antenna to wirelessly exchange data with a plurality of user nodes (not shown) over a plurality of radio channels. These user nodes may be, for example, mobile phones, personal computers, personal digital assistants, wireless email devices, and the like. Wireless base stations 120, 124, 128 may include wire line interfaces to forward data into provider edge node 110. Thus, wireless base stations 120, 124, 128 may be Node Bs in a 3G network or other base transceiver stations communicating in a Global System for Mobile Communications (GSM), Universal Mobile Telecommunications System (UMTS), Long Term Evolution (LTE) network, or other network.

Radio network controllers 130, 135 may be configured to manage a plurality of wireless base stations 120, 124, 128 through node 110. Thus, radio network controllers 130, 135 may direct the transmission and reception of data in wireless base stations 120, 124, 128 by controlling the radio transmitters and receivers in wireless base stations 120, 124, 128. It should be apparent that radio network controllers 130, 135 may be replaced by base station controllers or other devices capable of directing the operation of wireless base stations 120, 124, 128.

Packet-switched domain 140 may be a network connected to node 110 for receiving and transmitting packets. In particular, packet-switched domain 140 may include components configured to receive and forward packets from a packet-switched network, such as the Internet. Thus, packet-switched domain 140 may include a Serving General Packet Radio Services Support Node (SGSN) and a Gateway General Packet Radio Services Support Node (GGSN). Other suitable components for inclusion in packet-switched domain 140 will be apparent to those of skill in the art.

Circuit-switched domain 150 may be a network connected to node 110 for receiving and transmitting circuit-switched data. In particular, circuit-switched domain 150 may include components configured to receive and forward data from a circuit-switched network, such as the Public-Switched Telephone Network (PSTN). Thus, circuit-switched domain 150 may include a Mobile Switching Center (MSC) and a Gateway Mobile Switching Center (GSMC). Other suitable components for inclusion in circuit-switched domain 150 will be apparent to those of skill in the art.

It should be apparent that the description of system 100 as being a wireless network is exemplary. Thus, system 100 may instead include portions in which satellite-based or wireline communications are implemented. Suitable variations of system 100 in which node 110 is implemented will be apparent to those of skill in the art.

Figures 2, 3:
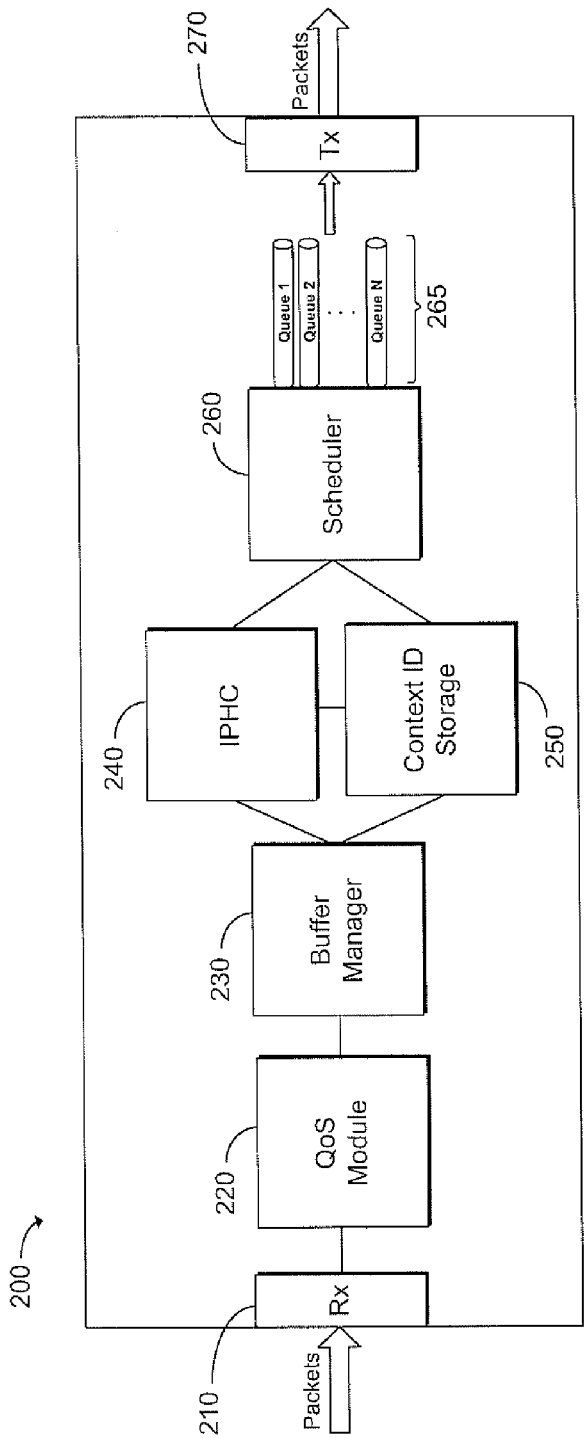
FIG. 2 is a schematic diagram of an exemplary network node for use in the system of FIG. 1, the network node implementing both header compression and traffic management functionality.
FIG. 3 is a schematic diagram of an exemplary data arrangement for use in the context identifier storage of FIG. 2.

FIG. 2 is a schematic diagram of an exemplary network node 200 for use in system 100 of FIG. 1. In various exemplary embodiments, node 200 includes a receiver 210, a QoS module 220, a buffer manager 230, an IP header compression (IPHC) module 240, context identifier storage 250, a scheduler 260, a plurality of queues 265, and a transmitter 270. As will be apparent from the following description, each of these components may communicate with one or more of the other components to implement the functionality of compressor 200.

According to the various exemplary embodiments, node 200 performs traffic management and header compression operations in an optimal order, such that maximal benefits are obtained for each function. In particular, as described in further detail below, node 200 may perform operations in the following order: QoS classification; buffer management; header compression; and scheduling.

Receiver 210 may include hardware and/or software encoded on a machine-readable storage medium configured to receive data from another network node. The hardware included in receiver 210 may be, for example, a network interface card that receives packets and other data. Thus, receiver 210 may be configured to receive a packet associated with a flow for which header compression and QoS provisioning is required. The packet may include a marking used to identify a quality of service required for the packet. Receiver 210 may then provide this packet to QoS module 220.

QoS module 220 may include hardware and/or software encoded on a machine-readable storage medium configured to read a packet marking and assign a quality of service classification to the packet based on the packet marking. In particular, QoS module 220 may include a table storing a correspondence between packet markings and the plurality of queues 265. QoS module 220 may associate a value with the packet, such that node 200 may determine which queue 265 should receive the packet when the packet reaches scheduler 260. As described in further detail below, each of the queues 265 may provide a predetermined quality of service, such that the packets are forwarded according to the requirements specified in the packet marking.

The packet markings included in the packet may be; for example, DSCP values transmitted in the Type of Service (ToS) field that specify a precedence of the packet and whether the packet requires low delay, high throughput, and/or high reliability. Alternatively, these markings may be Multi-Field Classification markings determined by analyzing multiple Layer 3 and Layer 4 header fields to identify a corresponding service class. Still further, these markings may be assigned based on an incoming interface. For example, high QoS traffic, medium QoS traffic, and low QoS traffic may each be received over a separate interface, such that the marking may be assigned based on the incoming interface.

Buffer manager 230 may include hardware and/or software encoded on a machine-readable storage medium configured to ensure that a buffer (not shown) in node 200 does not reach an overflow state. After performing the QoS functionality in QoS module 220, buffer manager 230 may query the buffer to determine whether the current occupancy of the buffer is greater than a predetermined threshold. When the current occupancy is greater than the threshold, buffer manager 252 discards the packet. Alternatively, when the current occupancy is less than or equal to the threshold, buffer manager 230 forwards the packet to IPHC module 240 for header compression, In some implementations, node 200 includes only one buffer. In these implementations, buffer manager 230 will query the same buffer for each packet. Alternatively, node 200 may include multiple buffers. As an example, node 200 may include a separate buffer for each queue 265. Accordingly, in these instances, buffer manager 230 may examine the QoS associated with the packet to identify an appropriate queue 265, then query the buffer associated with that queue. In this manner, delay may be minimized for higher priority packets.

It should be apparent that performing buffer management prior to header compression ensures that node 200 properly queues and transmits any full headers required to establish a compression context. In other words, node 200 ensures that there is room in the buffer prior to performing any compression of headers. In contrast, nodes that perform buffer management after header compression could potentially discard a full header, thereby affecting the compression context and potentially causing data loss at the decompressor.

IP header compression module 240 may include hardware and/or software encoded on a machine-readable storage medium configured to generate a full or compressed header including a context identifier. Thus, upon receipt of a packet associated with a flow at receiver 210, IPHC module 240 may access context identifier storage 250 to determine whether IPHC module 240 has already established a context identifier for the flow.

In making this determination, IPHC module 240 may first identify the flow associated with the packet using a plurality of fields associated with the packet. In particular, IPHC module 240 may access IP 5-tuple information from the packet header, the fields including the source IP address, source port, destination IP address, destination port, and protocol.

In various exemplary embodiments, IPHC module 240 may also consider the QoS classification assigned to the packet by QoS module 220. As an example, if DSCP is used to perform QoS classification, the ToS field in the IP header is used along with the other header fields to uniquely identify the flow. By considering the QoS classification associated with the packet, IPHC module 240 avoids inadvertent merging of multiple flows between the same two endpoints and thereby prevents potential misroutes or discards at the downstream decompressor. Furthermore, this arrangement ensures that all packets in a flow are assigned to the same queue 265 by scheduler 260.

As an example, suppose a user of a mobile handset seeks to browse the Internet and engage in a voice conversation simultaneously. Although browsing and voice would be assigned to different flows, the source address, source port, destination address, destination port, and protocol could potentially be identical. The flow associated with the web browsing, however, would likely be assigned a lower priority QoS classification than the voice flow. By considering the QoS classification associated with each packet, IPHC module 240 may distinguish between the flows and ensure that a different context identifier is used for the two flows.

When virtual forwarding and routing (VRF) on a forwarding information base (FIB) upstream from node 200, the virtual private network (VPN) identifier may also be utilized in uniquely identifying the flow. In particular, vise of the VPN ID prevents flow overlap that could potentially occur during the use of non-public addresses. For example, if two VPN connections use the same non-public addresses, failure to consider the VPN ID may result in assignment of the same context identifier, thereby introducing the problems detailed above.

After identifying the flow. IPHC module 240 may determine whether an identifier has been assigned to the flow by, for example, accessing context identifier storage 250. When IPHC module 240 determines that a context identifier has already been assigned for the identified flow, IPHC module 240 may retrieve the assigned context identifier and generation from context identifier storage 250. In contrast, when IPHC module 240 has not yet established a context identifier for the flow, IPHC module 240 may query context identifier storage 250 to identify a suitable context identifier. This context identifier may be, for example, an incremented or decremented value of the previous context identifier. Similarly, the generation value may be assigned by starting at 0 or the last-assigned value and incrementing for each subsequent generation.

After determining an existing context identifier or assigning a new one, IPHC module 240 may generate a full or compressed header. In particular, for the first packet in the flow and when a periodic update is required, IPHC module 240 may generate a full header including the context identifier and the generation. Alternatively, for subsequent packets, IPHC module 240 may generate a compressed header including the context identifier and the generation, but excluding one or more values from the packet header.

It should be apparent that, by performing header compression prior to scheduling the packet, node 200 may ensure that packets outputted from the queues in node 200 utilize all available bandwidth. By compressing packet headers prior to queuing the packets, node 200 ensures that the combined output of all packets with full headers, packets with compressed headers, and packets with uncompressed headers maxes out at the bandwidth available to node 200. In contrast, a system that performs header compression after the packet, is outputted from queue would either fail to use all available bandwidth or introduce jitter or delays for high priority traffic.

Context identifier storage 250 may comprise a set of context identifier information encoded on a machine-readable storage medium. Thus, context identifier storage 250 may be, for example, a table in a database that stores the information required to identify a flow, along with the context identifier and generation. Context identifier storage 250 may also store a QoS assigned to packets in the flow along with the context identification and flow information. The values stored in context identifier storage 250 may be updated each time a new flow is established or when certain fields in the flow change. For example, the values stored in context identifier storage 250 may be updated when a Time-to-Live (TTL) field changes, such that the generation is incremented and a slow start procedure is initiated. An exemplary data arrangement for use in context identifier storage 250 is further described below with reference to FIG. 3.

Node 200 may also include a traffic manager, which may include scheduler 260 and a plurality of queues 265. Scheduler 260 may include hardware and/or software encoded on a machine-readable storage medium configured to manage quality of service provisioning in node 200. Scheduler 260 may receive packets with full headers, packets with compressed headers, or uncompressed packets from IPHC module 240. Upon receipt of a packet from IPHC module 240, scheduler 260 may read the quality of service from the packet or otherwise determine the required quality of service, then place the packet in the corresponding queue of queues 265.

During regular periods of service (i.e. when there is no congestion), scheduler 260 may manage output of packets from each of the queues 265, preferentially outputting packets from higher priority queues. During periods of congestion, scheduler 260 may block the output of packets from one or more of queues 265. Thus, scheduler 260 may, for example, block the output of low or medium priority queues, while continuing to output packets from high priority queues.

Each of the plurality of queues 265 may be associated with a different quality of service. Thus, a first queue may be associated with real-time traffic that is sensitive to delays, such as Voice over IP (VoIP), video conferencing, and audio conferencing. A second queue may be associated with traffic that is less sensitive to delays, such as audio and video broadcasts. Finally, a number of other queues could be assigned to non-real time traffic, such as web browsing, chat, email, short message service (SMS), and other similar data transfers. Suitable assignments and configurations of queues 265 will be apparent to those of skill in the art.

Transmitter 270 may include hardware and/or software encoded on a machine-readable storage medium configured to send packets to another network node. The hardware included in transmitter 270 may be, for example, a network interface card that sends packets and other data. Thus, transmitter 270 may be configured to receive a packet outputted from one of the queues 265, then transmit the packet to a node serving as a decompressor in the telecommunications network.

It should be apparent from the foregoing description of node 200 that the ordering of buffer manager 230, IPHC module 240, and scheduler 260 ensures optimal performance of node 200. In particular, performing buffer management prior to header compression and header compression prior to scheduling of packets ensures that each function achieves the desired benefits.

FIG. 3 is a schematic diagram of an exemplary data arrangement 300 for use in context identifier storage 250 of FIG. 2. Data arrangement 300 may be, for example, a table in a database stored in context identifier storage 250. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include three sets of data: flow information field 310, context ID field 320, and QoS field 330. Flow information field 310 may indicate any information necessary to uniquely identify a flow. Context ID field 320 may be a unique value assigned by IPHC module 240 to identify a compression context between a node operating as a compressor and a node operating as a decompressor. Context ID field 320 may optionally include the current generation value associated with the corresponding context identifier. Finally, as described above, QoS field 330 may indicate the QoS generated by QoS module 220. QoS field 330 may also be used in uniquely identifying a flow such that flows with identical flow information fields 310 may be distinguished.

As an example, data 340 indicates the source IP address, source port, destination IP address, and destination port of a first flow. The context ID associated with this flow is 0, while the QoS associated with the flow is 7. As another example, data 350 indicates the source IP address, source port, destination IP address, and destination port of a second flow. The context ID associated with this flow is 1, while the QoS associated with the flow is 2. Data arrangement 300 may include numerous other data entries 360.

Figure 4:
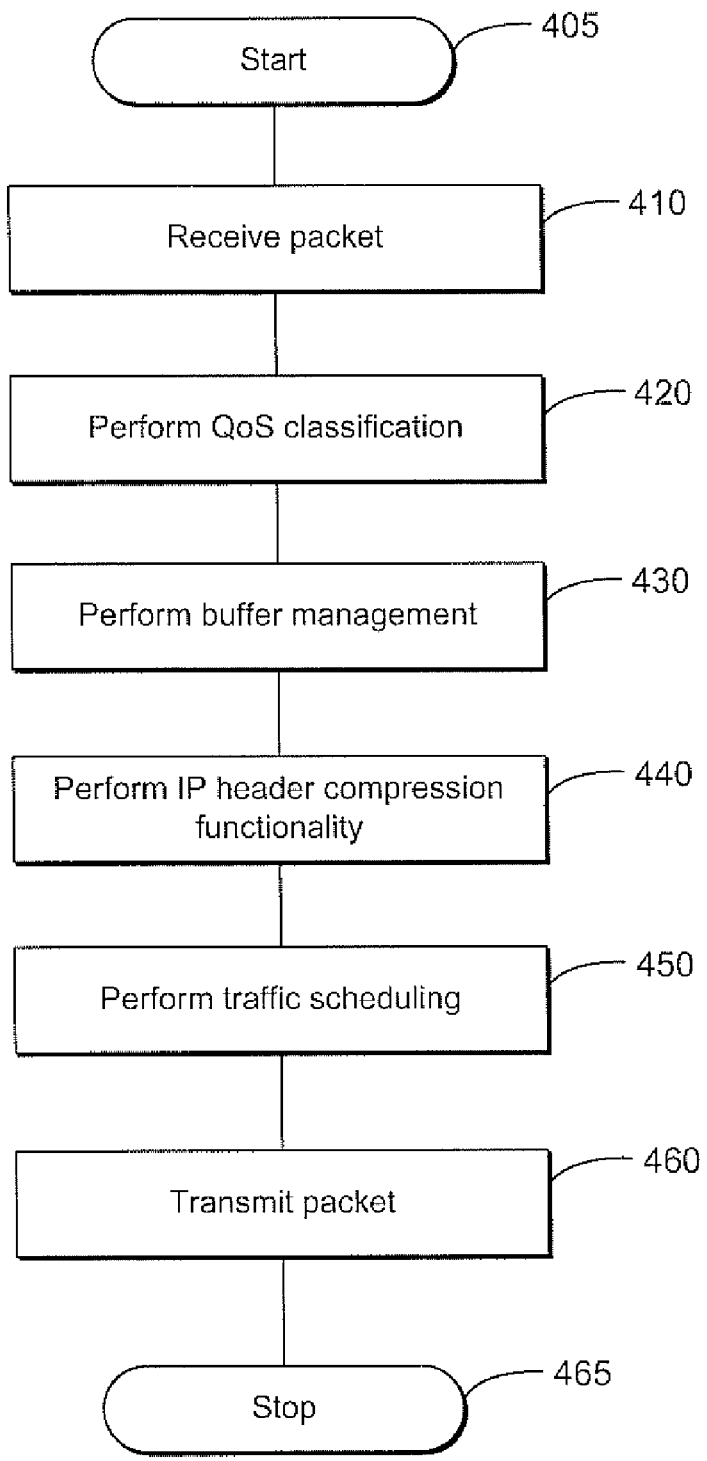
FIG. 4 is a flowchart of an exemplary method for performing both header compression and traffic management in a network node.

FIG. 4 is a flowchart of an exemplary method 400 for performing both header compression and traffic management in a network node. Exemplary method 400 starts in step 405 and proceeds to step 410, where node 200 receives a packet belonging to a flow for forwarding the packet towards a destination. The packet may include a marking indicating the priority of the packet. After receipt of the packet, exemplary method 400 proceeds to step 420, where a QoS module 220 may determine the QoS of the packet by accessing a table that stores a correspondence between packet markings and the QoS provided by each of a plurality of queries 265.

Exemplary method 400 then proceeds to step 430, where buffer manager 230 determines whether there is sufficient space in the buffer to queue the packet. When there is insufficient space for the packet, buffer manager 230 discards the packet. Otherwise, buffer manager 230 forwards the packet to IPHC module 240 for compression processing. It should be apparent that, because buffer manager 230 makes this determination before compression in IPHC module 240, method 400 will not discard packets chosen to include full headers for establishing or refreshing a compression context.

After performing buffer management in step 430, exemplary method 400 proceeds to step 440, where IPHC module 240 assigns a compression context identifier to the packet. In particular, IPHC module 240 may first determine whether a context identifier has been assigned to the flow. When IPHC module 240 determines that a context identifier has already been assigned for the identified flow, IPHC module 240 may retrieve the assigned context identifier and generation from context identifier storage 250. In contrast, when IPHC module 240 has not yet established a context identifier for the flow, IPHC module 240 may query context identifier storage 250 to identify an unassigned context identifier. After determining an existing context identifier or assigning a new one. IPHC module 240 may generate a full or compressed header including the context identifier and generation.

Exemplary method 400 then proceeds to step 450, where scheduler 260 enqueues the packet based on the packet marking. In particular, scheduler 260 may access a QoS associated with the packet by QoS module 220 or otherwise determine the QoS corresponding to the packet marking. Scheduler 260 may then enqueue the packet in the queue 265 corresponding to the determined QoS.

After queueing of the packet in step 450, exemplary method 400 proceeds to step 460, where scheduler 260 dequeues packets that were previously enqueued in step 450. Scheduler 260 may then forward the packet towards its destination using transmitter 270. Exemplary method 400 then proceeds to step 465, where method 400 stops.

According to the foregoing, various exemplary embodiments ensure a conflict-free interaction of packet header compression and traffic management functions in a network node. In particular, by performing buffer management prior to IP header compression, various exemplary embodiments ensure that full headers generated during an IP header compression routine are not discarded due to buffer congestion. Furthermore, by performing IP header compression prior to scheduling, various exemplary embodiments ensure that the bandwidth available to the node is optimally utilized.

It should be apparent from the foregoing description that various exemplary embodiments of the invention may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method for implementing header compression and traffic management functionality in a network node, the method comprising:
    receiving, at the network node, a packet belonging to a flow, the received packet including a marking used to identify a quality of service (QoS) required for the received packet;
    performing QoS classification based upon the marking;
    performing buffer management in the network node to determine whether a current occupancy level of a buffer in the network node is greater than a threshold level;
    when the current occupancy level of the buffer is less than or equal to the threshold level, performing header compression on the received packet in the network node;
    after performing the header compression, performing traffic scheduling in the network node to queue the compressed packet in a queue selected from a plurality of queues, each queue having a predetermined QoS associated with a particular level of sensitivity to delay, based on the marking in the compressed packet and to output the compressed packet from the selected queue; and
    forwarding the outputted packet towards a destination, whereby buffer management, header compression, and traffic scheduling are all performed in a single network node;
    wherein the step of performing header compression on the packet further comprises:
    accessing a plurality of fields associated with the packet to identify the flow associated with the packet; and
    assigning a compression context identifier to the packet, wherein the compression context identifier is a value uniquely assigned to the identified flow.

2. The method for implementing header compression and traffic management functionality according to claim 1, further comprising:
    when the current occupancy level of the buffer is greater than the threshold level, discarding the packet.

3. The method for implementing header compression and traffic management functionality according to claim 1, wherein the step of performing buffer management further comprises:
    identifying the queue corresponding to the quality of service required for the packet;
    selecting a buffer from a plurality of buffers, the selected buffer corresponding to the identified queue; and
    determining whether a current occupancy level of the selected buffer is greater than a threshold level.

4. The method for implementing header compression and traffic management functionality according to claim 1, wherein the step of performing header compression on the packet further comprises:
    outputting a packet including a full header for traffic scheduling, the full header including the compression context identifier, a generation value, and all fields necessary to uniquely identify the flow.

5. The method for implementing header compression and traffic management functionality according to claim 1, wherein the step of performing header compression on the packet further comprises:
    outputting a packet including a compressed header for traffic scheduling, the compressed header including the context identifier and a generation value, but omitting one or more fields necessary to uniquely identify the flow.

6. The method for implementing header compression and traffic management functionality according to claim 1, wherein the plurality of fields comprise the QoS required for the packet.

7. The method for implementing header compression and traffic management functionality according to claim 6, wherein the plurality of fields further comprise a source address, a source port, a destination address, and a destination port.

8. The method for implementing header compression and traffic management functionality according to claim 6, wherein the plurality of fields further comprise a virtual private network (VPN) identifier.

9. The method for implementing header compression and traffic management functionality according to claim 1, further comprising
    determining the selected queue by accessing a table stored in the network node, the table storing a correspondence between packet markings and the plurality of queues.

10. A network node implementing header compression and traffic management functionality, the network node comprising:
    a receiver that receives a packet belonging to a flow, the packet including a marking used to identify a quality of service (QoS) required for the packet;
    a QoS module that performs QoS classification based upon the marking;
    a buffer manager that determines whether a current occupancy level of a buffer in the network node is greater than a threshold level, and forwards the received packet tbr header compression when the current occupancy level of the buffer is less than or equal to the threshold level;
    a header compression module that performs header compression on the forwarded packet after the buffer manager processes the received packet; and
    a traffic manager comprising a plurality of queues, each queue associated with a predetermined QoS associated with a particular level of sensitivity to delay, the traffic manager further comprising a scheduler that performs, after header compression:
    queuing the compressed packet in a queue selected from the plurality of queues based on the marking in the compressed packet, and outputting the packet from the selected queue and towards a destination,
    whereby buffer management, header compression, and traffic scheduling are all performed in a single network node;
    wherein the header compression module accesses a plurality of fields associated with the packet to identify the flow associated with the packet and
    assigns a compression context identifier to the packet, wherein the compression context identifier is a value uniquely assigned to the identified flow.

11. The network node according to claim 10, wherein the buffer manager discards the packet when the current occupancy level of the buffer is greater than the threshold level.

12. The network node according to claim 10, wherein the buffer manager identifies the queue corresponding to the quality of service required for the packet, selects a buffer from a plurality of buffers, the selected buffer corresponding to the identified queue and, determines whether a current occupancy level of the selected buffer is greater than a threshold level.

13. The network node according to claim 10, wherein the header compression module outputs a packet including a full header for traffic scheduling, the full header including the compression context identifier, a generation value, and all fields necessary to uniquely identify the flow.

14. The network node according to claim 10, wherein the header compression module outputs a packet including a compressed header for traffic scheduling, the compressed header including the compression context identifier and a generation value, but omits one or more fields necessary to uniquely identify the flow.

15. The network node according to claim 10, wherein the plurality of fields comprise the QoS required for the packet.

16. The network node according to claim 15, wherein the plurality of fields further comprise a source address, a source port, a destination address, and a destination port.

17. The network node according to claim 15, wherein the plurality of fields further comprise a virtual private network (VPN) identifier.

18. The network node according to claim 10, wherein the scheduler determines the selected queue by accessing a table stored in the single network node, the table storing a correspondence between packet markings and the plurality of queues.

* * * * *

UNITED STATES PATENT AND TRADEMARK OFFICE
CERTIFICATE OF CORRECTION

| | | |
|---|---|---|
| PATENT NO. | : 8,031,607 B2 | Page 1 of 1 |
| APPLICATION NO. | : 12/362292 | |
| DATED | : October 4, 2011 | |
| INVENTOR(S) | : Michel Rochon, Adrian Ellsworth and Vernon Joshua Stanley Dennis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 128 days.

Claim 10, column 12, line 39, please change "tbr" to --for--.

Signed and Sealed this
Twenty-ninth Day of November, 2011

David J. Kappos
*Director of the United States Patent and Trademark Office*